(12) United States Patent
Arai et al.

(10) Patent No.: US 7,510,314 B2
(45) Date of Patent: Mar. 31, 2009

(54) BACKLIGHT DEVICE

(75) Inventors: Takeo Arai, Saitama (JP); Takashi Oku, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/595,355

(22) PCT Filed: Aug. 15, 2005

(86) PCT No.: PCT/JP2005/014916

§ 371 (c)(1),
(2), (4) Date: Apr. 12, 2006

(87) PCT Pub. No.: WO2006/019077

PCT Pub. Date: Feb. 23, 2006

(65) Prior Publication Data

US 2007/0121320 A1     May 31, 2007

(30) Foreign Application Priority Data

Aug. 18, 2004   (JP)  ............................ 2004-238792

(51) Int. Cl.
    *F21V 7/04* (2006.01)
(52) U.S. Cl. .................. 362/609; 362/612; 362/625
(58) Field of Classification Search ................ 362/609, 362/612, 623–625, 800, 633, 634
See application file for complete search history.

(56) References Cited

U.S. PATENT DOCUMENTS

| | | | | |
|---|---|---|---|---|
| 2,242,590 | A | * | 5/1941 | Moreau ................ 362/341 |
| 3,701,898 | A | * | 10/1972 | McNamara, Jr. .......... 362/341 |
| 6,007,209 | A | * | 12/1999 | Pelka .................... 362/30 |
| 7,178,951 | B1 | * | 2/2007 | Hsiao et al. .............. 362/362 |
| 7,185,995 | B2 | * | 3/2007 | Hatanaka et al. ........... 362/29 |
| 7,318,664 | B2 | * | 1/2008 | Hatanaka et al. .......... 362/555 |
| 2003/0026096 | A1 | * | 2/2003 | Ellens et al. ............. 362/231 |
| 2007/0002590 | A1 | * | 1/2007 | Jang et al. ............... 362/633 |
| 2007/0230206 | A1 | * | 10/2007 | Hsiao et al. .............. 362/560 |

* cited by examiner

FOREIGN PATENT DOCUMENTS

| | | |
|---|---|---|
| JP | 07-169309 | 7/1995 |
| JP | 10-134619 | 5/1998 |
| JP | 2001-195904 | 7/2001 |

OTHER PUBLICATIONS

International Search Report dated Sep. 13, 2005.

*Primary Examiner*—John A Ward
(74) *Attorney, Agent, or Firm*—Sonnenschein Nath & Rosenthal LLP

(57) ABSTRACT

The present invention is directed to a backlight device using light emitting units (7) in which a large number of light emitting diodes (12) are mounted, which comprises a reflection plate (16) for reflecting rays of light which have been emitted from a light emitting unit (11), wherein the reflection plate (16) is composed of a bottom surface reflection plate (16a) for reflecting rays of light emitted from the light emitting units (7) from the bottom surface direction, side surface reflection plates (16b) to (16e) for reflecting rays of light emitted from the light emitting units (7) from respective forward and backward, and left and right side surface directions, and corner reflection plates (16f) to (16i) in which the bottom surface reflection plate (16a) and the side surface reflection plates (16b) to (16e) are connected to cover the respective corner portions, and serves to permit rays of light incident onto a display panel (1) to be uniform to realize uniformity of brightness of the entire surface thereof.

4 Claims, 5 Drawing Sheets

BACKLIGHT DEVICE

TECHNICAL FIELD

The present invention relates to a backlight device useful when used in a display apparatus such as liquid crystal display apparatus, etc.

This Application claims priority of Japanese Patent Application No. 2004-238792, filed on Aug. 18, 2004, the entirety of which is incorporated by reference herein.

BACKGROUND ART

Hitherto, since Liquid Crystal Display apparatuses can realize large-sized display screen, light weight, thin structure and/or low power consumption, etc. as compared to Cathode-Ray Tube (CRT), they are used in Television Image Receiver and/or display apparatus for various display purposes along with, e.g., self-light emitting type Plasma Display Panel (PDP), etc. In the liquid crystal display apparatus, liquid crystals are included between two transparent bases (substrates) of various sizes to apply voltage across the transparent electrodes to vary orientation of liquid crystal molecules to change light transmission factor to optically display a predetermined image, etc.

In the liquid crystal display apparatuses, since the liquid crystal itself is not light emitting body, there is provided a backlight unit functioning as a light source, e.g., at the rear face portion of the liquid crystal panel. The backlight unit comprises, e.g., primary light source, light guide plate, reflection film, lens sheet and/or diffusion film, etc. and serves to deliver display light over the entire surface of the liquid crystal panel. In the backlight unit, Cold Cathode Fluorescent Lamp (CCLF) adapted so that mercury or xenon is included within fluorescent tube is used as primary light source. However, it is necessary to solve the problems that light emitting luminance that the cold cathode fluorescent lamp has is low, life time is short and/or low luminance region exists at the cathode side so that uniformity ratio, etc. is bad.

Meanwhile, in liquid crystal display apparatuses of the large size, there is generally provided an Area Litconfiguration Backlight unit in which plural elongated cold cathode fluorescent lamps are disposed at the rear face of the diffusion plate to deliver display light to the liquid crystal panel. Also in such area litconfiguration backlight unit, it is necessary to solve the problems resulting from the above-described cold cathode fluorescent lamp. Particularly, in the case where the area litconfiguration backlight unit is applied to such a large sized television image receiver above 40 inches, the problems of realization of high luminance and realization of high uniformity ratio become more conspicuous.

On the other hand, in the area litconfiguration backlight units, in place of the above-described cold cathode florescent lamp, attention is drawn to backlight of the Light Emitting Diode (hereinafter referred to as LED as occasion may demand) area light type in which a large number of red, green and blue LEDs of light three primary colors are two-dimensionally arranged in the state positioned at the rear face side of the diffusion film to obtain white light. Such LED backlight unit permits reduction of cost with realization of reduction of cost of LED, and permits display of high luminance on large-sized liquid crystal panel by low power consumption.

Moreover, the LED backlight unit is caused to be of the configuration in which a large number of LEDs are mounted on wiring board to diffuse rays of light which have been emitted from the LEDs by diffusion plate to emit the rays of light thus obtained to the liquid crystal panel. Further, in order to efficiently guide light, to the diffusion plate, rays of light which have been emitted from the LEDs disposed at the edge portion of the LED backlight unit, there is provided a reflection plate. Since the reflection plate permits rays of light which have been emitted from the LEDs to be efficiently emitted to the liquid crystal panel, the reflection plate is composed of a bottom surface reflection plate, and forward and backward, and left and right side surface reflection plates.

Meanwhile, in the LED backlight unit, as shown in FIG. 1, respective corner portions where the bottom surface reflection plate and the forward and backward, and left and right side surface reflection plates are connected to each other are furthest apart from LEDs 20A to 20D disposed in the vicinity of these corner portions. In this case, FIG. 2 shows the LEDs 20A to 20D arranged in the vicinity of respective corner portions in an enlarged manner. Since the LEDs 20A to 20D are arranged in this way, in the case where rays of light which have been emitted from the LEDs 20A to 20D arranged in the vicinity of respective corner portions of the LED backlight unit are reflected by the reflection plate, luminance would be lowered as compared to reflected light from LEDs arranged at places except for the portions in the vicinity of the corner portions. When luminance of reflected light is lowered in this way, the corner portion of the liquid crystal panel becomes dark.

DISCLOSURE OF THE INVENTION

Problems to be Solved by the Invention

The present invention has been proposed in view of problems that prior arts as described above have, and its object is to provide a backlight device which can maintain luminance values of rays of reflected light from respective corner portions to a degree equal to luminance values of rays of reflected light from other places to realize image display of high quality.

An embodiment of the backlight device to which the present invention is applied is directed to a backlight device comprised of a light source unit where a large number of light emitting diodes are mounted, which comprises a reflection plate for reflecting rays of light emitted from the light source unit, wherein the reflection plate includes a bottom surface reflection plate for reflecting rays of light emitted from the light source unit from bottom surface direction, side surface reflection plates for reflecting rays of light which have been emitted from the light source unit from forward and backward, and left and right respective side surface directions, and corner reflection plates for covering respective corner portions where the bottom surface reflection plate and the side surface reflection plates are connected.

The reflection surface of the corner reflection plate may take polygonal shape, or may take flat-plate shape or curved surface.

In the backlight device according to the present invention, respective corner portions are covered, by using the corner reflection plates by connections between the bottom surface reflection plate and the side surface reflection plates so that distances from LEDs located in the vicinity of respective corner portions are permitted to be nearly equal to distances up to LEDs located at the other positions and the reflection plates. Thus, it is possible to avoid the phenomenon where the corner portion becomes dark at the front surface of the liquid crystal panel.

It is to be noted that it is desirable in the present invention to use sheet-shaped reflection plate as respective reflection plates.

Still further objects of the present invention and practical merits obtained by the present invention will become more apparent from the embodiments which will be explained with reference to the attached drawings.

BEST MODE FOR CARRYING OUT THE INVENTION

Best mode for carrying out the invention will now be explained in detail with reference to the attached drawings.

Figure 1:
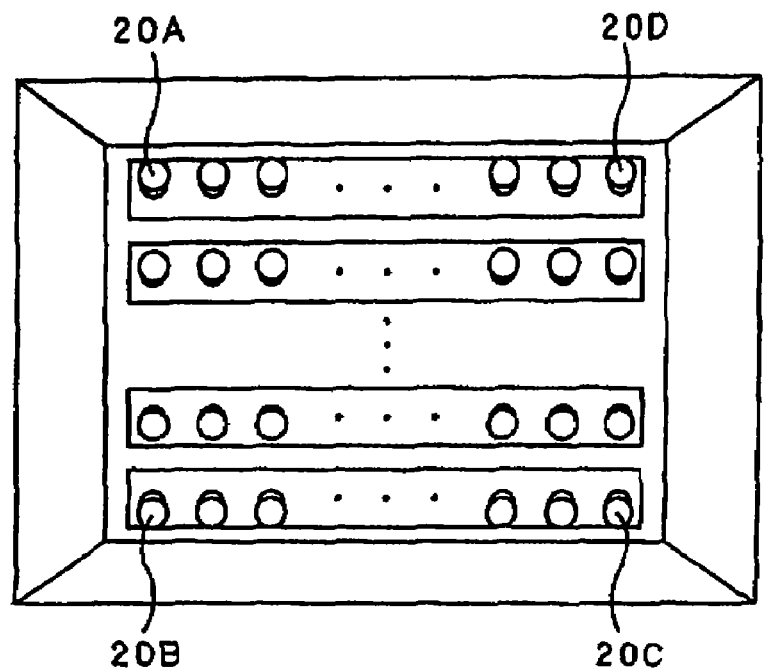
FIG. 1 is a plan view showing a configuration example of a conventional reflection sheet.
Figure 2:
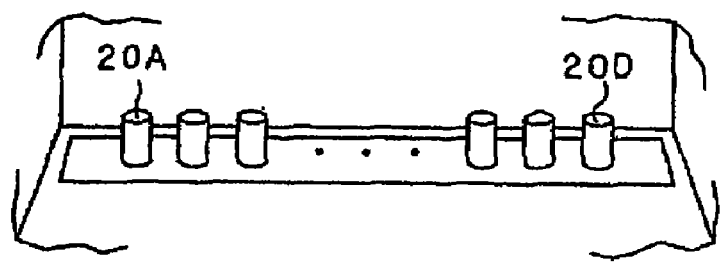
FIG. 2 is an enlarged view of the reflection sheet shown in FIG. 1.
Figure 3:
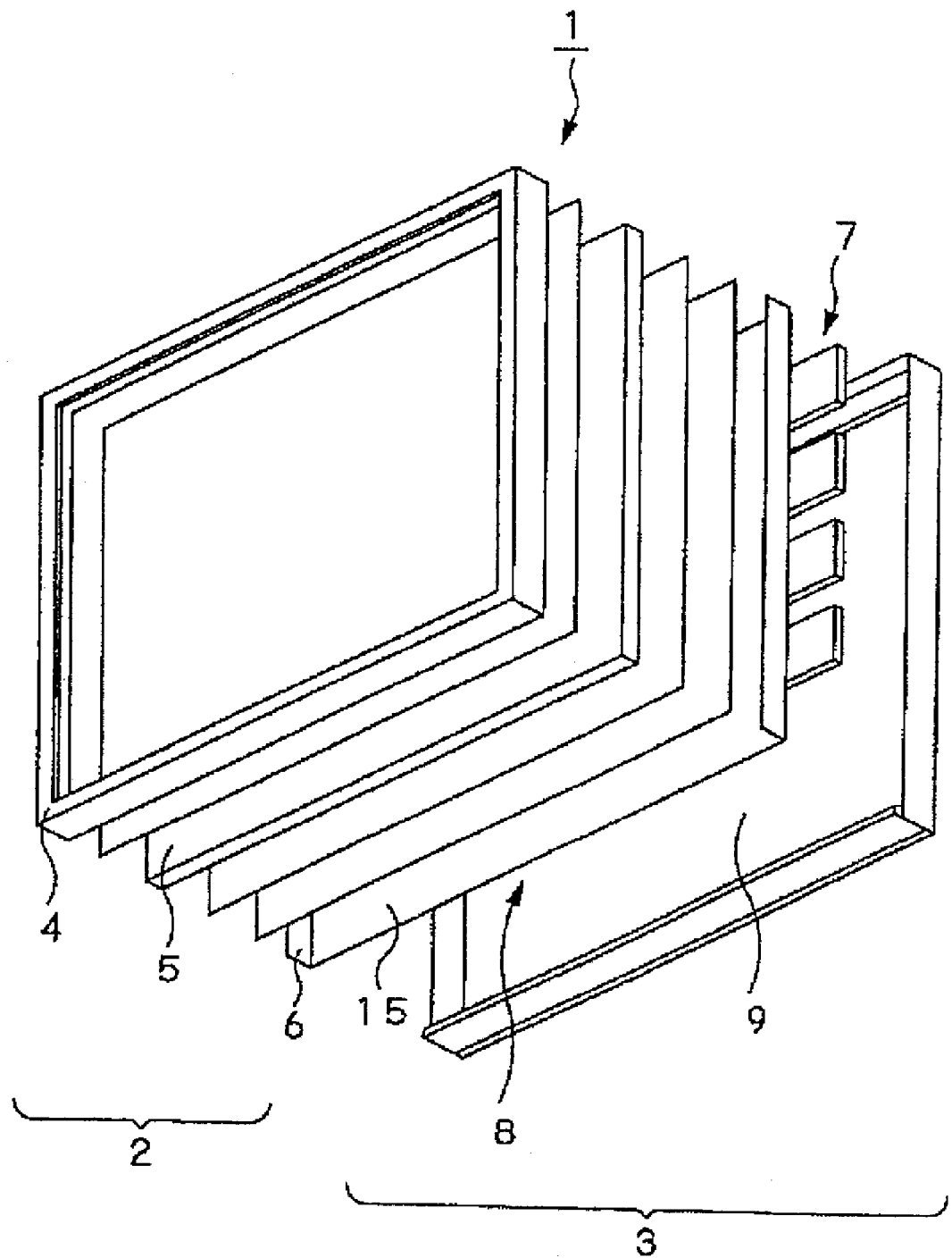
FIG. 3 is an essential part exploded perspective view showing an embodiment of a transmission type liquid crystal display panel to which the present invention is applied.
Figure 4:
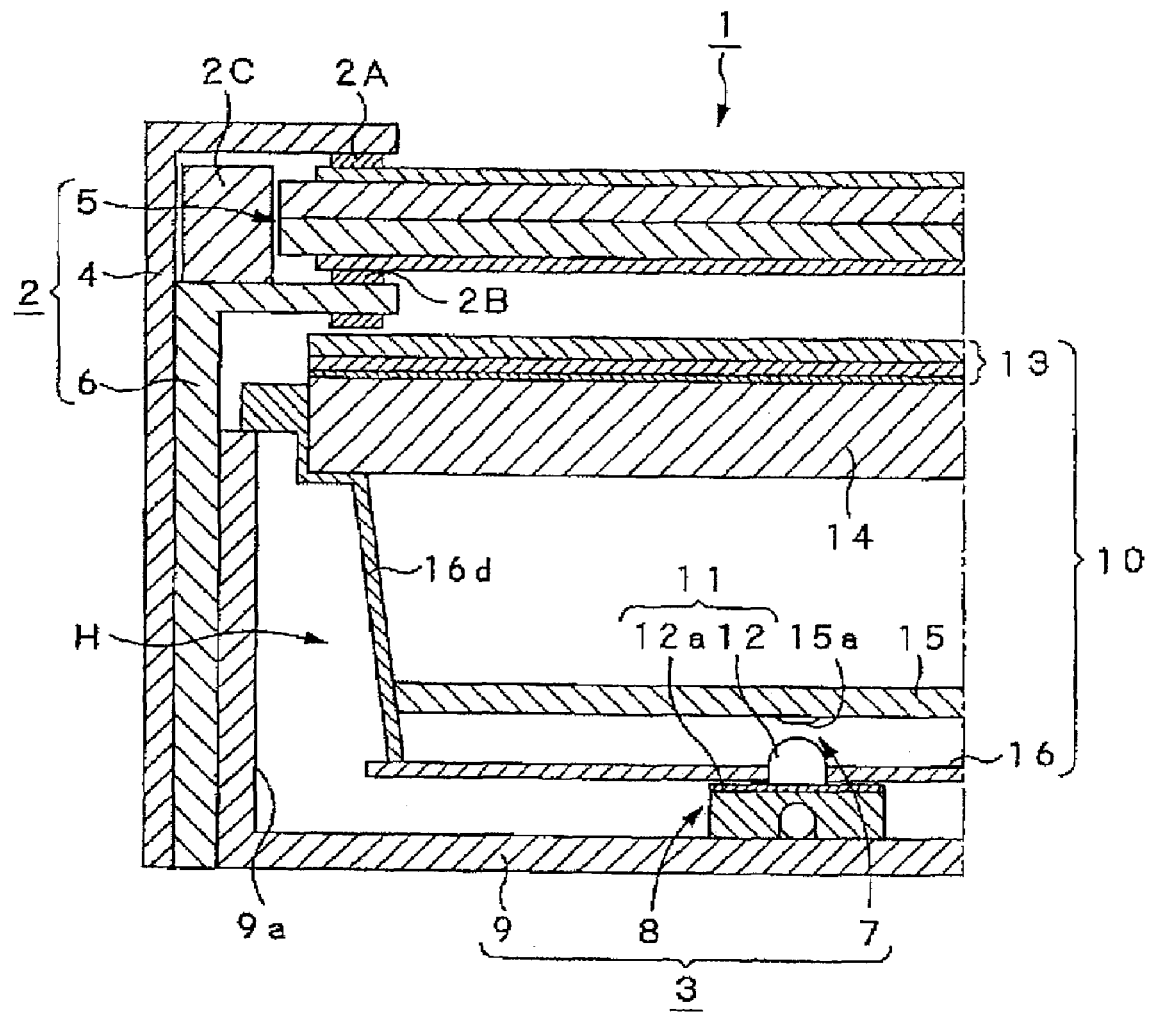
FIG. 4 is an essential part longitudinal cross sectional view of the transmission type liquid crystal display panel.

The transmission type liquid crystal display panel 1 to which the present invention is applied is used for display panel of television image receiver having large-sized screen above, e.g., 40 inches. As shown in FIGS. 3 and 4, the transmission type liquid crystal display panel 1 comprises a liquid crystal panel unit 2, and a backlight unit 3 combined with the rear face side of the liquid crystal panel unit 2 and serving to deliver display light. The liquid crystal panel unit 2 is composed of a frame-shaped front face member 4, a liquid crystal panel 5, and a frame-shaped rear face frame member 6 for holding the outer peripheral edge portion of the liquid crystal panel 5 through spacers 2a, 2b and/or guide member 2c, etc. between the liquid crystal panel 5 and the front face frame member 4 with the spacers 2a, 2b and the guide member 2c, etc. put therebetween.

Although the detail is omitted, the liquid crystal panel 5 is adapted to include liquid crystals between a first glass base (substrate) and a second glass base (substrate) with opposite spacing being held therebetween by spacer beads, etc. to apply voltage across the liquid crystals to vary orientation of liquid crystal molecules to change light transmission factor. The liquid crystal panel 5 is adapted so that a stripe-shaped transparent electrode, an insulating film and an orientation film are formed at the internal surface of the first glass base. The liquid crystal panel 5 is adapted so that color filters of three primary colors, an overcoat layer, a stripe-shaped transparent electrode and an orientation film are formed at the internal surface of the second glass base. The liquid crystal panel 5 is adapted so that deflection film and phase difference film are connected on the surfaces of the first and second glass bases.

The liquid crystal panel 5 is adapted so that the orientation film consisting of polyimide is caused to be of the configuration in which liquid crystal molecules are arranged at the interface in a horizontal direction, and the deflection film and the phase difference film allow the waveform characteristic to be non-colored and to be changed into white to perform realization of full color by the color filters to perform color display of receive image, etc. It is to be noted that the liquid crystal panel 5 is not limited to such structure, but liquid crystal panels of various configurations conventionally provided may be used.

The backlight unit 3 constituting the backlight device according to the present invention comprises a unit 7 disposed at the rear face side of the above-described liquid crystal panel unit 2 and serving to deliver display light, a radiating unit 8 for radiating heat which has been produced within the light emitting unit 7, and a back panel 9 for holding the light emitting unit 7 and the radiating unit 8 and combined with the front face frame member 4 and the rear face frame member 6 to constitute attachment member with respect to casing. The backlight unit 3 has dimensions facing the rear face side of the liquid crystal panel unit 2 over the entire surface thereof and combined in the state where opposite space portion constituted between the backlight unit 3 and the liquid crystal panel 2 is optically hermetically sealed.

Figure 5:
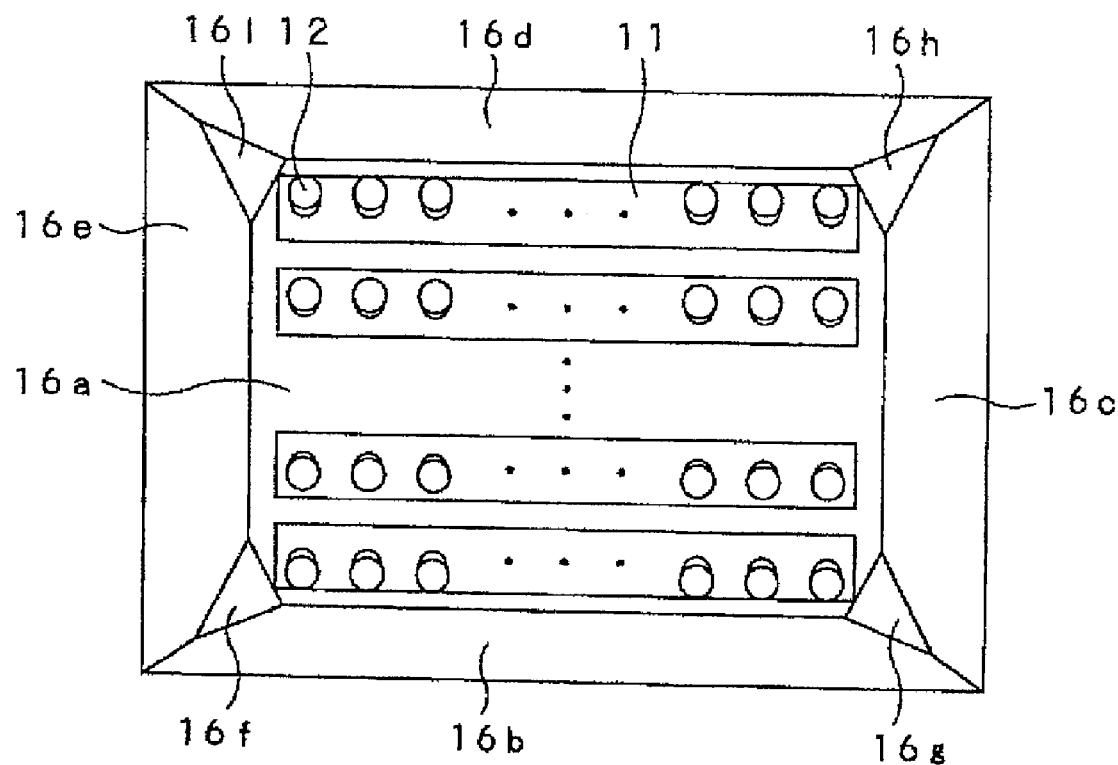
FIG. 5 is a plan view showing a first example of the reflection sheet.

Meanwhile, the light source unit 7 constituting the backlight unit 3 comprises an optical sheet block 10, and a light emitting block 11 including a large number of light emitting diodes. The optical sheet block 10 constituting the light source unit 7 is provided in the state facing the rear face side of the liquid crystal panel 5. Although the detail is omitted, as shown in FIGS. 4 and 5, for example, the optical sheet block 10 is composed of an optical functional sheet laminated body 13 in which various optical functional sheets such as deflection film, phase difference film, prism sheet and/or diffusion film, etc. are laminated, a diffusion light guide plate 14, a diverter plate 15, a bottom surface reflection sheet 16a for reflecting rays of light from the bottom surface thereof, side surface reflection sheets 16b to 16e for reflecting rays of light from the side surface, and corner reflection sheets 16f to 16i for covering corner portions composed of the bottom surface reflection sheet 16a and the side surface reflection sheets 16b to 16e, etc. Although the detail is omitted, the optical functional sheet laminated body 13 is caused to be of the configuration in which plural optical functional sheets such as functional sheet for decomposing display light which is delivered from the light emitting block 11 and incident onto the liquid crystal panel 5 into orthogonal polarization component, functional sheet for compensating phase difference of light wave to perform realization of broad angle of visibility and/or prevention of coloring and/or functional sheet for diffusing display light, etc. are laminated. It is to be noted that the optical functional sheet laminated body 13 is not limited to the above-described laminated body using optical function sheets, but may be laminated body comprising, e.g., luminance improvement film for realizing improvement in luminance, phase difference film and/or upper and lower two diffusion sheets with which prism sheet is put therebetween, etc.

Moreover, the light emitting block 11 is composed of a plurality of red LEDs, green LEDs and blue LEDs (hereinafter generally referred to as LEDs), and a laterally elongated rectangular wiring board 12a on which these LEDs 12 are mounted in a predetermined order. The transmission type liquid crystal display panel 1 is constituted by, e.g., 18 units, each comprised of light emitting block 11 where, e.g., 25 LEDs 12 in total in which a suitable number of red LEDs, green LEDs and blue LEDs are combined are mounted on the wiring board 12a. It is to be noted that the light emitting block 11 is adapted so that the number of LEDs 12 of 1 (one) unit and combination of LEDs 12 mounted thereat are suitably determined in dependency upon the dimensions (size) of display screen and/or light emitting ability of respective LEDs 12, etc.

The optical sheet block 10 is adapted so that a diffusion light guide plate 14 is arranged, in laminated state, on the principal surface side facing the liquid crystal panel 5 of the optical functional sheet laminated body 13, and display light emitted from the light emitting block 11 is incident from the rear face side thereof. The diffusion light guide plate 14 is comprised of a plate body having slight thickness which is molded by transparent synthetic resin having conductivity, e.g., acrylic resin or polycarbonate resin, etc. The diffusion light guide plate 14 serves to refract and reflect rays of display light which have been incident from one surface side to guide the display light thus obtained while diffusing it to allow the display light thus guided to be incident from the other surface side onto the optical functional sheet laminated body 13. As shown in FIG. 4, the diffusion light guide plate 14 is attached, as shown in FIG. 4, to an outer circumferential wall portion 9a of the back panel 9 through bracket member (not shown) along with the optical functional sheet laminated body 13.

Further, the optical sheet block 10 is adapted so that the diverter plate 15 and the bottom surface reflection sheet 16a are attached to the back panel 9 in the state where opposite spacing therebetween and the opposite spacing between the optical sheet block 10 and the above-described diffusion light guide plate 14 are maintained by a large number of optical stud members (not shown). The diverter plate 15 is a plate material formed by transparent synthetic resin material, e.g., acrylic resin, etc., and is adapted so that outgoing light emitted from the light emitting block 11 is incident thereon. At the diverter plate 15, as the detail will be described later, a large number of light adjustment dots 15a are formed so as to respectively face a large number of LEDs 12 which are array-arranged with respect to the light emitting block 11.

The light adjustment dots 15a are formed as circular dot pattern on the surface of the diverter plate 15 by screen print, etc. by using ink in which, e.g., light shielding agent such as titanium oxide or barium sulfide, etc. and diffusion agent such as glass powder or silicon oxide, etc. are mixed. These light adjustment dots 15a serve to shield rays of display light which have been emitted from the light emitting block 11. The diverter plate 15 on which these light adjustment dots 15a are formed serves to shield a portion of rays of display light directly incident from respective LEDs 12 provided at the light emitting block 11 to reflect rays of the display light thus obtained toward the bottom surface reflection sheet 16a side which will be described later to suppress that luminance is partially increased to permit incident light to be uniform to emit the incident light thus obtained onto the optical functional sheet laminated body 13.

As described above, the optical sheet block 10 is caused to be of the configuration to radiate a portion of rays of display light emitted from the respective LEDs 12 toward the periphery thereof by the diverter plate 15 so that there does not take place partial high luminance portion resulting from the fact that display light of large capacity is partially directly incident onto the diffusion light guide plate 14. Moreover, the optical sheet block 10 serves to reflect rays of display light which have been radiated, by the diverter plate 15, toward the periphery in a manner directed to the diffusion light guide plate 14 side through the diverter plate 15 for a second time by the bottom surface reflection sheet 16a, the side surface reflection sheets 16b to 16e, and corner reflection sheets 16f to 16i to realize improvement in light efficiency. The bottom surface reflection sheet 16a, the side surface reflection sheets 16b to 16e and the corner reflection sheets 16f to 16i are formed by, e.g., porous PET (polyethylene terephthalate) material including fluorescent agent. The porous PET material has high reflection factor characteristic of about 95%, and damage of the reflection surface does not conspicuous by color tone different from the metal glossy color. It is to be noted that the bottom surface reflection sheet 16a, the side surface reflection sheets 16b to 16e and the corner reflection sheets 16f to 16i may be also formed by, e.g., silver, aluminum or stainless steel having mirror surface, etc.

Further, at the optical sheet block 10, when a portion of rays of display light emitted from the respective LEDs 12 is incident on the diverter plate 15 in the state above critical angle, it is reflected on the surface of the diverter plate 15. At the optical sheet block 10, rays of reflected light from the surface of the diverter plate 15 and a portion of rays of display light which have been radiated from the respective LEDs toward the periphery and reflected by the bottom surface reflection sheet 16a, the side surface reflection sheets 16b to 16e and corner reflection sheets 16f to 16i are repeatedly reflected between the diverter plate 15, the bottom surface reflection sheet 16a, the side surface reflection sheets 16b to 16e and the corner reflection sheets 16f to 16i so that improvement in reflection factor by the amplifying reflection principle is performed.

Figure 6:
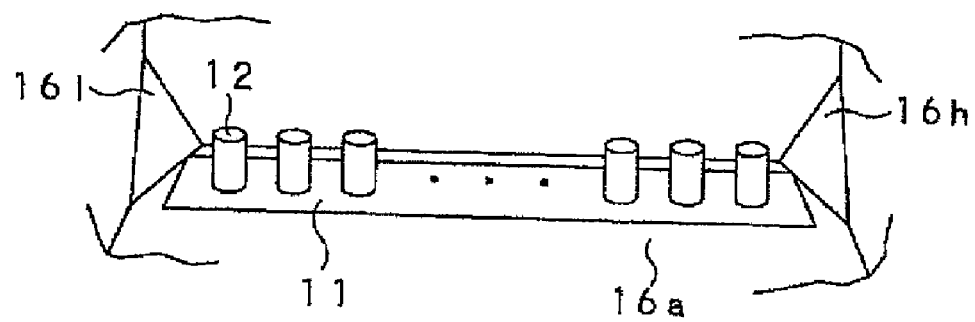
FIG. 6 is an enlarged view of the reflection sheet shown in FIG. 5.
Figure 7:
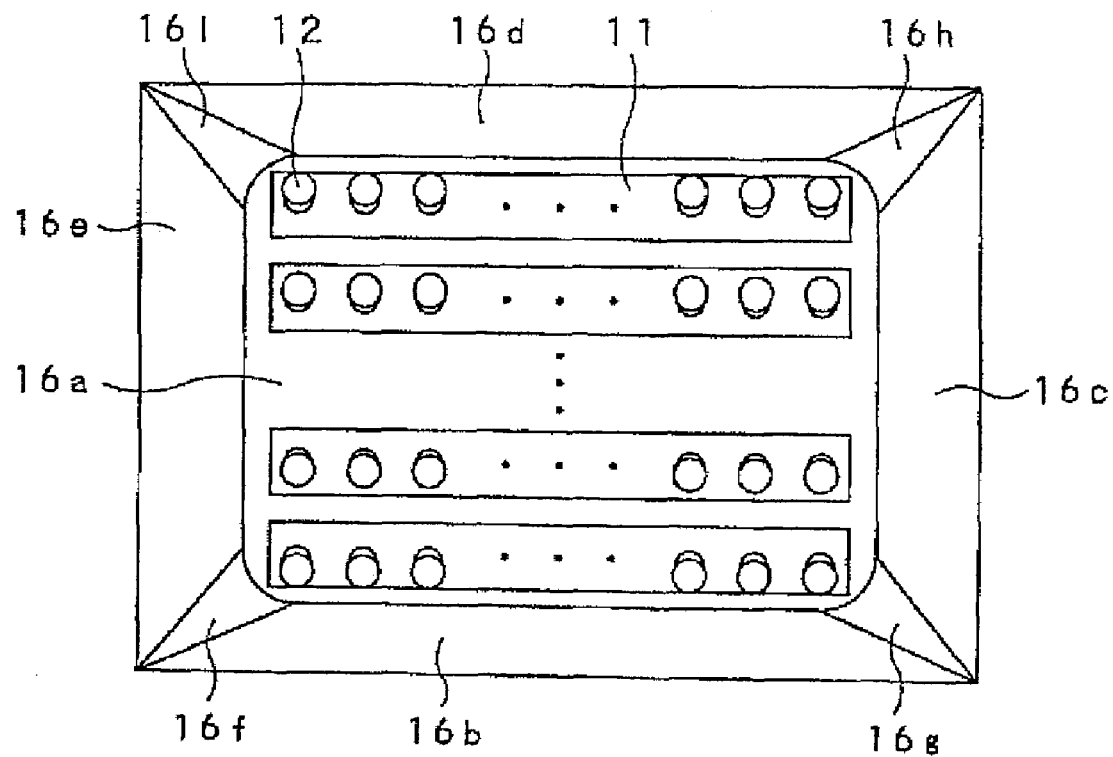
FIG. 7 is a plan view showing a second example of the reflection sheet.

Here, the relationship of arrangement of the bottom surface reflection sheet 16a, the side surface reflection sheets 16b to 16e, and the corner reflection sheets 16f to 16i will be explained with reference to FIGS. 5, 6 and 7.

The bottom surface reflection sheet 16a serves to reflect rays of outgoing light which have been emitted from the respective LEDs 12 and rays of light which have been reflected from the diverter plate 15 toward the front face (direction of the diverter plate 15). Moreover, the side surface reflection sheets 16b to 16e serve to reflect rays of outgoing light which have been emitted from the respective LEDs 12 and rays of light which have been reflected from the bottom surface reflection sheet 16a toward the front face (direction of the diverter plate 15). Further, the corner reflection sheets 16f to 16i are arranged at respective corner portions as the result of the fact that the bottom surface sheet 16a and the side surface reflection sheets 16b to 16e are connected (bonded) to reflect rays of display light emitted from the respective LEDs 12 toward the front face (direction of the diverter plate 15).

Figure 8:
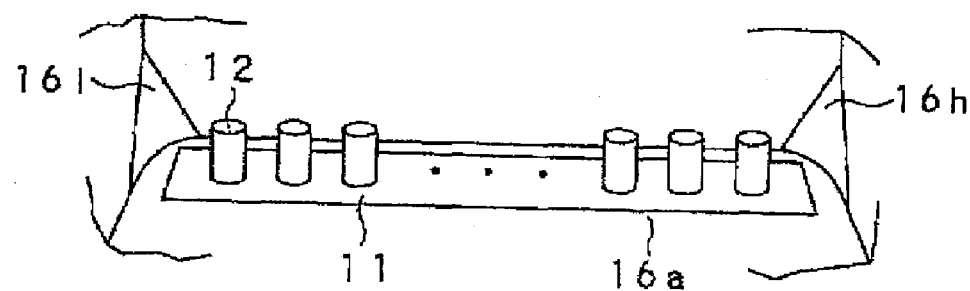
FIG. 8 is an enlarged view of the reflection sheet shown in FIG. 7.

Further, as shown in FIG. 5, the corner reflection sheets 16f to 16i are adapted so as to take plane shape in a manner to cover respective corner portions in which the bottom surface reflection sheet 16a and the side surface reflection sheets 16b to 16e are connected. Moreover, FIG. 6 shows an enlarged view of FIG. 5. It is to be noted that it is only required that forms of corner reflection sheets 16f to 16i are such shape to cover respective corner portions, and therefore may be, e.g., spherical recessed surface, elliptical recessed surface, and/or polygonal shape or non-spherical shape in which plural polygonals are collected. In addition, the corner reflection sheets may have spherical shape as shown in FIG. 7. FIG. 8 shows an enlarged view of FIG. 7.

As stated above, respective corner portions formed by connection of the bottom surface reflection sheet 16a and the side surface reflection sheets 16b to 16e are covered by corner reflection sheets 16f to 16i so that distances from LEDs 12 located in the vicinity of respective corner portions are nearly equal to distances up to the other reflection sheets. For this reason, luminance values of rays of reflected light from the corner reflected sheets 16f to 16i are equal to luminance values of other rays of reflected light. Accordingly, over the entire surface of the liquid crystal panel, luminance is caused to be uniform, thus making it possible to avoid that the corner portion becomes dark.

In addition, while the side surface reflection plate 16 is fixed to bracket member (not shown) which supports the diffusion light guide plate 14 in this embodiment, the side surface reflection plate 16 may be caused to be of the configuration to reflect rays of light which have been emitted from the LEDs 12 in a direction of the diverter plate, but is not limited to such configuration.

It is to be noted that while the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by appended claims.

The invention claimed is:

1. A backlight device comprising:
   a rectangular surface reflection sheet having front, backward, left side and right side directions along its surface and four corner portions;
   a plurality of side reflection sheets;
   a plurality of corner reflection sheets;
   a light source unit, mounted on the surface reflection sheet, comprising a plurality of light emitting diodes;
   a diverter plate located above the light source unit; and
   a diffusion sheet located above the diverter plate,
   wherein,
   the diverter plate reflects light rays orthogonal to its surface back to the rectangular surface reflection sheet,
   the diffusion plate reflects light received from the diverter plate to the side and corner reflection sheets,
   the side reflection sheets are positioned along respective edges of said rectangular surface reflection sheet and extend at an angle therefrom, adjacent side reflection sheets abutting along adjoining edges,
   the corner reflection sheets covering interior corners formed by the surface reflection sheet and the side reflection sheets at the corner portions of the surface reflection sheet,
   the side and corner reflection sheets reflect light emitted from the light source unit towards the front, backward, left side and right side surface directions,
   light emitting diodes of the light source unit are located at the corner portions of the surface reflection sheet, and
   each of the light emitting diodes located in the corner portions of the rectangular surface reflection sheet is equidistant from the two closest side reflection sheets and the corner reflection sheet forming the interior corner at said reflection surface corner portion.

2. The backlight device as set forth in claim 1, wherein a reflection surface of the corner reflection sheet takes a polygonal shape.

3. The backlight device as set forth in claim 1, wherein a reflection surface of the corner reflection sheet takes a flat sheet shape.

4. The backlight device as set forth in claim 1, wherein a reflection surface of the corner reflection sheet takes a spherical shape.

* * * * *